US011879958B2

(12) United States Patent
Wiebold et al.

(10) Patent No.: US 11,879,958 B2
(45) Date of Patent: Jan. 23, 2024

(54) SYSTEM AND METHOD FOR USING AN INDUSTRIAL MANIPULATOR FOR ATMOSPHERIC CHARACTERIZATION LIDAR OPTICS POSITIONING

(71) Applicant: Honeywell International Inc., Morris Plains, NJ (US)

(72) Inventors: Matthew Wiebold, Northfield, MN (US); Xiao Zhu Fan, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 1270 days.

(21) Appl. No.: 16/153,348

(22) Filed: Oct. 5, 2018

(65) Prior Publication Data

US 2019/0377092 A1 Dec. 12, 2019

Related U.S. Application Data

(60) Provisional application No. 62/681,461, filed on Jun. 6, 2018.

(51) Int. Cl.
*G01S 17/95* (2006.01)
*G01S 7/481* (2006.01)
*G01S 17/86* (2020.01)

(52) U.S. Cl.
CPC ............ *G01S 17/95* (2013.01); *G01S 7/4813* (2013.01); *G01S 17/86* (2020.01)

(58) Field of Classification Search
CPC ....................................................... G01S 17/86
See application file for complete search history.

(56) References Cited

U.S. PATENT DOCUMENTS 7,908,757 B2    3/2011  Ferrari
8,220,173 B2 *  7/2012  Tait .......................... G01H 1/16
                                                      33/503
(Continued)

FOREIGN PATENT DOCUMENTS

CA       2105501 A1      3/1995
CN    106312997 A  *   1/2017  .............. B25J 5/005
(Continued)

OTHER PUBLICATIONS

R. Antonello, R. Oboe, A. Ramello, K. Ito, N. Felicini and A. Cenedese, "IMU-aided image stabilization and tracking in a HSM-driven camera positioning unit," 2013, 2013 IEEE International Symposium on Industrial Electronics, pp. 1-5 (Year: 2013).*

(Continued)

*Primary Examiner* — Yuqing Xiao
*Assistant Examiner* — Benjamin Richard Hebert
(74) *Attorney, Agent, or Firm* — Fogg & Powers LLC

(57) ABSTRACT

A system includes a light detection and ranging (LiDAR) unit comprising an atmospheric characterization transceiver module. The LiDAR unit is configured to transmit light into an external interaction air region, and collect scattered portions of the transmitted light from the external interaction air region. A robotic arm is operatively coupled to the atmospheric characterization transceiver module. A processor is in operative communication with the robotic arm. The processor is configured to control the robotic arm to position and point the atmospheric characterization transceiver module in a direction of interest to interrogate the external interaction air region.

20 Claims, 4 Drawing Sheets

(56) References Cited

U.S. PATENT DOCUMENTS

| | | | |
|---|---|---|---|
| 9,594,381 B1* | 3/2017 | Clark | G01S 7/4813 |
| 9,746,852 B1* | 8/2017 | Watts | G01S 17/86 |
| 9,802,656 B1 | 10/2017 | Williams et al. | |
| 2009/0310118 A1 | 12/2009 | Halldorsson | |
| 2011/0149268 A1* | 6/2011 | Marchant | G01S 17/58 |
| | | | 356/27 |
| 2011/0304737 A1* | 12/2011 | Evans | G01S 3/7864 |
| | | | 348/169 |
| 2012/0182392 A1 | 7/2012 | Kearns et al. | |
| 2013/0162974 A1 | 6/2013 | Dakin et al. | |
| 2015/0233962 A1 | 8/2015 | Tchoryk et al. | |
| 2015/0345907 A1* | 12/2015 | Varga | F41G 3/147 |
| | | | 89/41.05 |
| 2017/0090141 A1* | 3/2017 | Chin | G02B 6/4478 |
| 2017/0191822 A1* | 7/2017 | Becker | G01S 17/89 |
| 2017/0305015 A1 | 10/2017 | Krasny et al. | |
| 2018/0027772 A1* | 2/2018 | Gordon | G05D 1/104 |
| 2018/0073838 A1* | 3/2018 | Szlemko | F41G 5/22 |
| 2018/0236654 A1* | 8/2018 | Mozeika | B25J 5/005 |
| 2019/0154806 A1* | 5/2019 | Zweigle | G01S 7/4808 |
| 2019/0346562 A1* | 11/2019 | Peng | G01S 13/86 |

FOREIGN PATENT DOCUMENTS

| | | | | |
|---|---|---|---|---|
| CN | 206643501 U | * | 11/2017 | |
| CN | 108415000 B | * | 10/2021 | B25J 9/04 |
| JP | H06198586 A | | 7/1994 | |
| JP | H829533 A | | 2/1996 | |
| JP | 2005538374 A | | 12/2005 | |
| JP | 2006110678 A | | 4/2006 | |
| JP | 2007101492 A | | 4/2007 | |
| JP | 200826127 A | | 2/2008 | |
| JP | 2008250905 A | | 10/2008 | |
| JP | 2014509417 A | | 4/2014 | |
| WO | 2017198555 A1 | | 11/2017 | |

OTHER PUBLICATIONS

European Patent Office, "Communication pursuant to Article 94(3) from EP Application No. 19177782.0", from Foreign Counterpart to U.S. Appl. No. 16/153,348, dated Feb. 25, 2020, pp. 1-4, Published: EP.

Sjoholm et al., "Lidars for Wind Tunnels—a IRPWind Joint Experiment Project", Energy Procedia 137, pp. 339-345, ScienceDirect, Elsevier.

Abb, "IRB 6640—Industrial Robots From ABB Robotics", https://new.abb.com/products/robotics/industrial-robots/irb-6640, Downloaded May 31, 2018, pp. 1-3.

European Patent Office, "Extended European Search Report from EP Application No. 19177782.0", from Foreign Counterpart to U.S. Appl. No. 16/153,348, dated Oct. 10, 2019, pp. 1-5, Published: EP.

Japanese Patent Office, "Notice of Reason for Rejection", from JP Application No. 2019-097399, dated Mar. 9, 2023, from Foreign Counterpart to U.S. Appl. No. 16/153,348, pp. 1 through 11, Published: JP.

Japanese Patent Office, "Notice of Reason for Rejection", from JP Patent Application No. 2019-097399, from Foreign Counterpart to U.S. Appl. No. 16/153,348, dated Aug. 3, 2023, pp. 1 through 9, Published: JP.

* cited by examiner ism and method for using an industrial manipulator for atmospheric characterization lidar optics positioning

CROSS REFERENCE TO RELATED APPLICATION

This application claims the benefit of priority to U.S. Provisional Application No. 62/681,461, filed on Jun. 6, 2018, which is herein incorporated by reference.

BACKGROUND

Light detection and ranging (LiDAR) systems interrogate a volume of space (air or other mediums) or an area of a surface by pointing or transmitting an optical beam towards this volume or surface, and then collecting or receiving the reflected or scattered photons. The volume or area interrogated by a LiDAR system is defined by the direction of the transmit and receive optics. To expand on this interrogation volume or area is not a trivial matter.

Scanning the transmit and receive optics at different angles and positions can increase or change the LiDAR interrogation volume or area. However, this approach is challenging due to the cost, reliability, performance tradeoffs, and manufacturability of the scanning mechanism. Due to the high optical performance of LiDAR systems, the optical alignment, optical losses, and timing need to be optimized and preserved through the scanning motion. As a result, there are design tradeoffs that need to be made based on the LiDAR application and user.

SUMMARY

A system includes a light detection and ranging (LiDAR) unit comprising an atmospheric characterization transceiver module. The LiDAR unit is configured to transmit light into an external interaction air region, and collect scattered portions of the transmitted light from the external interaction air region. A robotic arm is operatively coupled to the atmospheric characterization transceiver module. A processor is in operative communication with the robotic arm. The processor is configured to control the robotic arm to position and point the atmospheric characterization transceiver module in a direction of interest to interrogate the external interaction air region.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
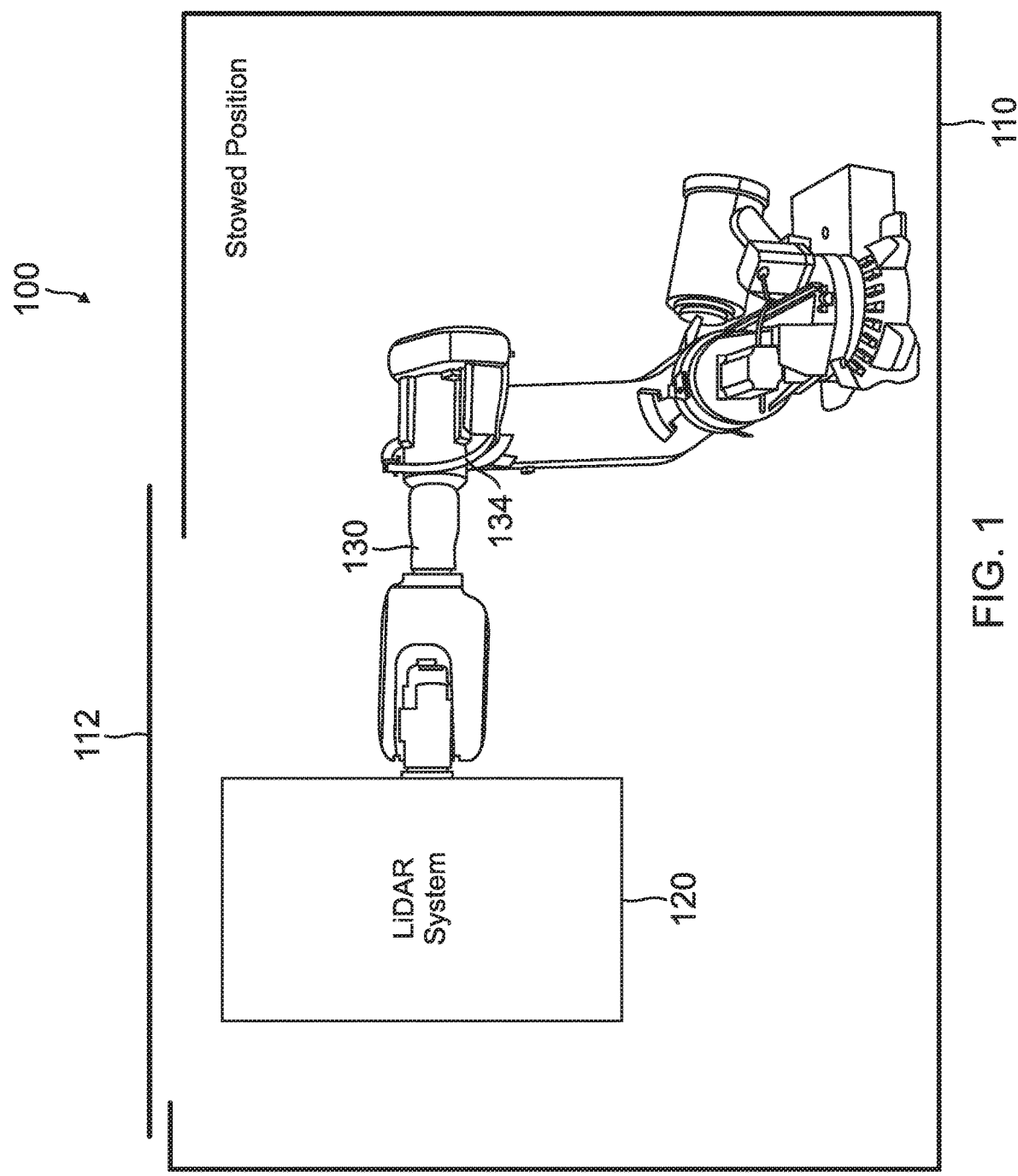
FIG. 1 is a diagram illustrating a positioning apparatus for LiDAR atmospheric characterization, according to one embodiment, with the positioning apparatus in a stowed position.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for using an industrial manipulator for atmospheric characterization light detection and ranging (LiDAR) optics positioning are disclosed. The present system and method are intended to solve the challenges of scanning a high-powered LiDAR system with large receive optics. In general, the system uses an automatic manipulator, such as a robotic arm, to position, scan, and point a LiDAR transceiver (transmitter and receiver), without the use of conventional mirrors and scanners.

In one embodiment, a robotic arm is operatively coupled to a LiDAR atmospheric characterization transceiver module. By extending and aiming the robotic arm in the direction of interest, the transceiver module can interrogate a volume of air in the pointing direction. The robotic arm has multiple degrees of freedom, allowing the transceiver module to be pointed in any direction. The extra degrees of freedom allow the transceiver module to be translated and/or rotated in specific configurations or on a selected path/plane or on a selected vector.

The system can repurpose off-the-shelf industrialization tooling equipment to replace expensive and custom designed scanners. When used, the off-the-shelf equipment can reduce the cost and schedule of manufacture, simplify system design, and simplify service and operation of the system. For example, in the use of a robotic arm to point and scan an atmospheric characterization LiDAR transceiver, the robotic arm replaces a two axis (elevation and azimuth) scanner that uses costly, high performance mirrors to direct optical signals.

Using the robotic arm, with several additional degrees of freedom compared to the two axes of scanning of conventional scanners, enables a wide range of stability functions and new operational possibilities. For example, the robotic arm enables easy stowing and securing of the LiDAR system; enables adaptive feedback to increase pointing stability; increases optical head reach and thus simplifies installation or tear down; and increases operational environmental ranges.

In addition, the robotic arm can be used to actively track an object in the atmosphere. When the robotic arm is installed on a platform that also includes a weapon system, such as on a military vehicle, the robotic arm can be used to track the weapon system so that the LiDAR and weapon system are always pointed in the same direction.

The present approach has several technical benefits, including decreasing optical losses due to the elimination of mirrors; reducing the number of optical alignments; better point stability and accuracy; higher environmental robustness; simplification of system integration; and potential reduction of system footprint. Other advantages of the present approach include reduced cost and procurement lead time; simplification of servicing and maintenance; and use of off-the-shelf components with multiple possible suppliers, reducing the risk of obsolescence.

Further details of various embodiments are described hereafter with reference to the drawings.

FIG. 1 illustrates a positioning apparatus 100 for LiDAR atmospheric characterization, according to one embodiment. The positioning apparatus 100 includes a housing 110 that has a removable cover 112. A LiDAR system 120 is located in housing 110 and generally includes an atmospheric characterization transceiver module, which includes a laser transmitter and a set of light collection optics. A robotic arm 130 is mounted within housing 110 and is operatively coupled to LiDAR system 120. An umbilical cord 134 is coupled to the transceiver module and can run along robotic arm 130 to any stationary supporting equipment. The umbilical cord 134 provides power, optical seeding, cooling, and other communication signals to the transceiver module. FIG. 1 shows a stowed position of LiDAR system 120 within housing 110, with cover 112 closed.

Figure 2:
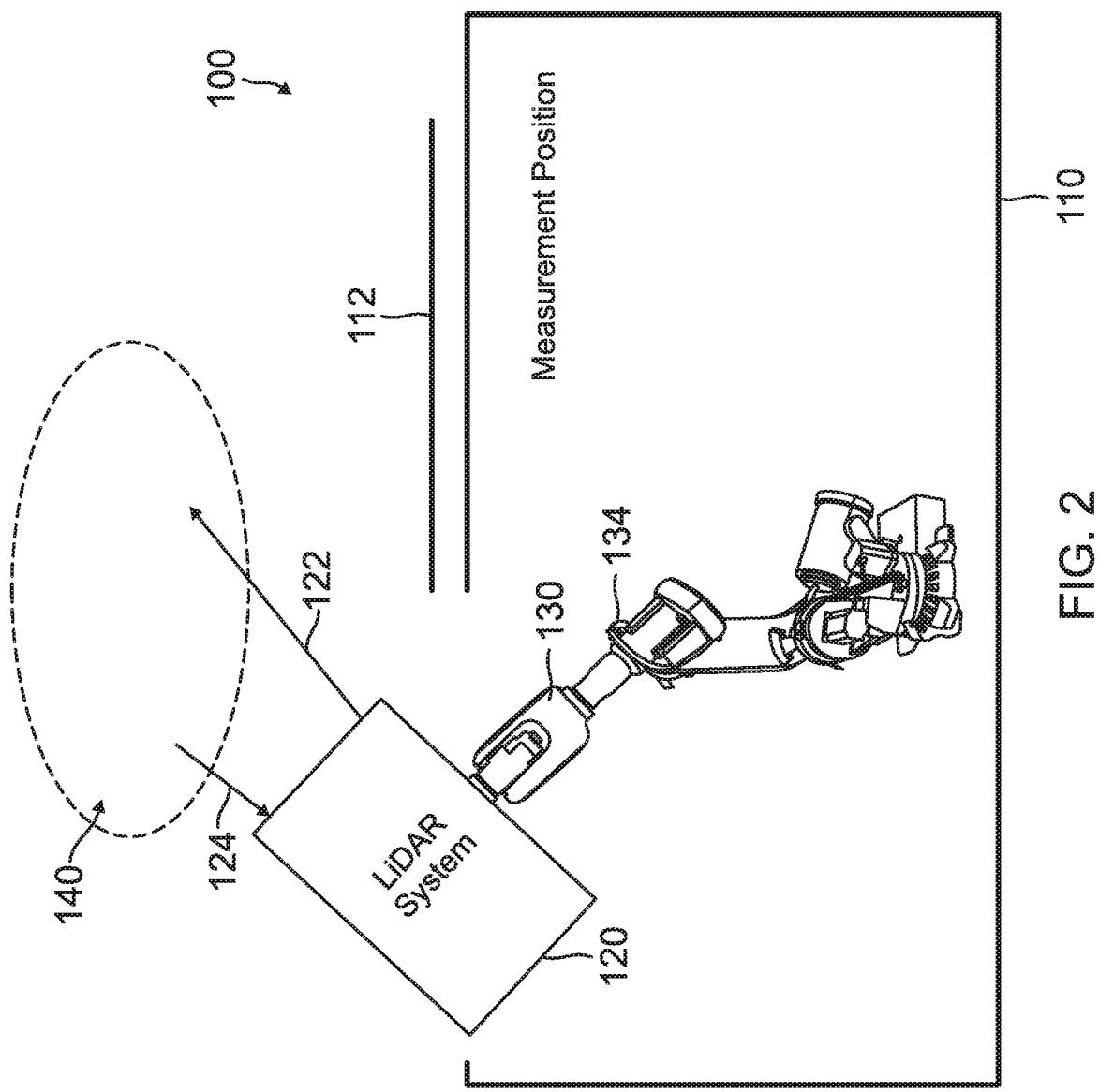
FIG. 2 is a diagram illustrating the positioning apparatus of FIG. 1 in a measurement position.

FIG. 2 illustrates positioning apparatus 100 in a measurement position for LiDAR system 120. In the measurement position, after cover 112 is opened, robotic arm 130 extends and positions LiDAR system 120 such that the transceiver module transmits light 122 into an external interaction air region 140 and collects a scattered portion 124 of the transmitted light.

Figure 3:
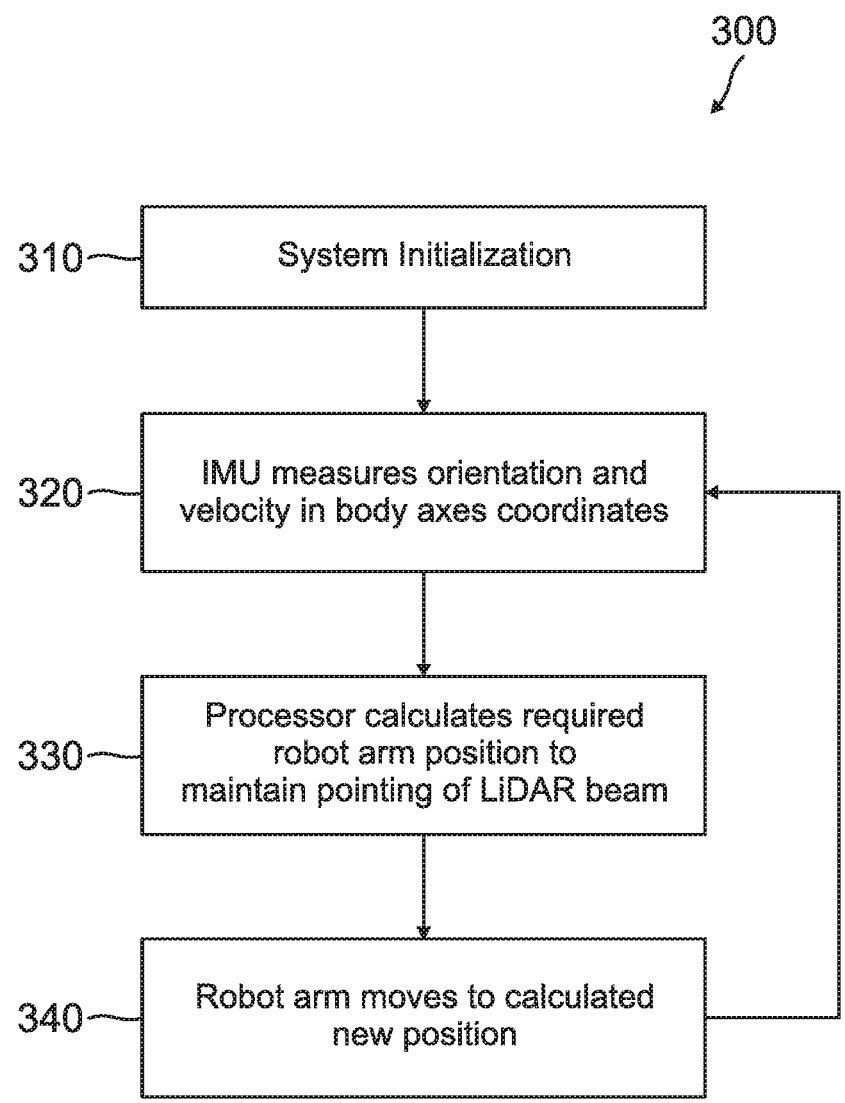
FIG. 3 is a process flow diagram of a method for active LiDAR stabilization, according to one implementation.

When the robotic arm is installed on a moving or unstable platform, such as on a vehicle (e.g., ground vehicle, aerial vehicle, water vehicle), the robotic arm can be used to stabilize the pointing direction or location of the LiDAR system with the help of an inertial measurement unit (IMU) located on the vehicle and a processor, to provide active stabilization. FIG. 3 is a process flow diagram of a method 300 for active stabilization, according to one implementation.

The method 300 first performs a system initialization (block 310), after which the IMU measures orientation and velocity in body axes coordinates (block 320). A processor then calculates a required robot arm position to maintain pointing of the LiDAR beam (block 330), using the measurements from the IMU. The processor then sends commands to the robot arm to move to the calculated new position (block 340). The method 300 then repeats starting at block 320 to provide an adaptive feedback for maintaining active stabilization of the LiDAR system.

Figure 4:
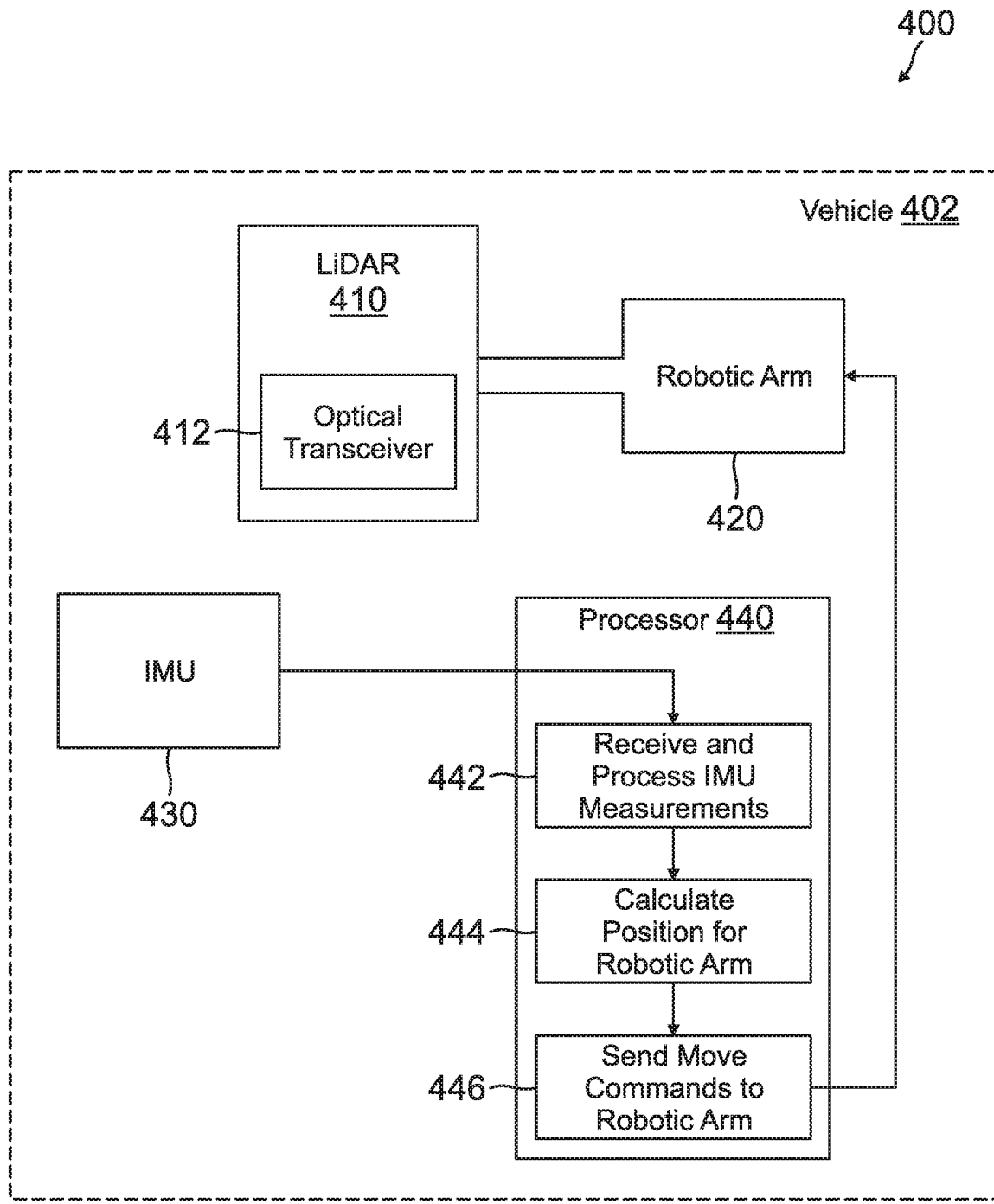
FIG. 4 is a block diagram of a system for active LiDAR stabilization, according to one embodiment.

FIG. 4 is a block diagram of a system 400, which includes active LiDAR stabilization for a vehicle 402, according to one embodiment. The system 400 comprises a LiDAR unit 410 that includes an optical transceiver 412, and a robotic arm 420 operatively coupled to LiDAR unit 410. The robotic arm 420 is mounted to vehicle 402 and is operative to move LiDAR unit 410 into multiple different positions and orientations. An inertial measurement unit (IMU) 430 is deployed on vehicle 402 and is configured to generate inertial data for vehicle 402. A processor unit 440 onboard vehicle 402 is in operative communication with IMU 430.

The processor unit 440 is operative to receive and process the inertial data, including orientation and velocity measurements of vehicle 402 in body axes coordinates, from IMU 430 (block 442). The processor unit 440 calculates a required position for robotic arm 420 (block 444), to maintain pointing of a beam from optical transceiver 412 in a direction of interest, based on the measurements from IMU 430. The processor unit 440 then sends commands to robotic arm 420 (block 446), so that robotic arm 420 moves to the required position based on the calculations. The foregoing steps can be repeated starting at block 442 to provide an adaptive feedback for maintaining active LiDAR stabilization.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system and method.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system comprising: a light detection and ranging (LiDAR) unit comprising an atmospheric characterization transceiver module, the LiDAR unit configured to transmit light into an external interaction air region, and collect scattered portions of the transmitted light from the external interaction air region; a robotic arm operatively coupled to the atmospheric characterization transceiver module; and a processor in operative communication with the robotic arm, the processor configured to control the robotic arm to position and point the atmospheric characterization transceiver module in a direction of interest to interrogate the external interaction air region.

Example 2 includes the system of Example 1, wherein the atmospheric characterization transceiver module includes a laser transmitter and a set of light collection optics.

Example 3 includes the system of any of Examples 1-2, wherein the system is installed on a movable or unstable platform.

Example 4 includes the system of Example 3, wherein the platform comprises a vehicle.

Example 5 includes the system of any of Examples 3-4, wherein the platform includes an inertial measurement unit (IMU) operatively coupled to the processor.

Example 6 includes the system of Example 5, wherein the processor is operative to provide an active stabilization of the LiDAR unit using the IMU.

Example 7 includes the system of Example 6, wherein the processor is operative to: (a) receive IMU measurements comprising orientation and velocity in body axes coordinates; (b) calculate a required position for the robotic arm to maintain pointing of the transceiver module in the direction of interest; (c) send commands to the robotic arm to move to the calculated required position; and (d) repeat the previous steps starting at step (a) to provide an adaptive feedback for maintaining the active stabilization of the LiDAR unit.

Example 8 includes the system of any of Examples 1-7, further comprising a housing having a removable cover, the housing configured to store the LiDAR unit in a stowed position with the cover closed.

Example 9 includes the system of Example 8, wherein the removable cover is configured to open, allowing the robotic arm to extend and position the LiDAR unit in a measurement position.

Example 10 includes a system comprising: a LiDAR unit onboard a vehicle and comprising an optical transceiver module, the LiDAR unit configured to transmit light into an external interaction air region, and collect scattered portions of the transmitted light from the external interaction air region; a robotic arm mounted to the vehicle and operatively coupled to the LiDAR unit, the robotic arm operative to move the LiDAR unit into multiple different positions and orientations; an IMU deployed on the vehicle and operative to generate inertial data for the vehicle; and a processor unit onboard the vehicle, the processor unit in operative communication with the IMU and the robotic arm, wherein the processor unit is operative to: (a) receive and process the inertial data from the IMU, the inertial data comprising orientation and velocity measurements of the vehicle in body axes coordinates; (b) calculate a required position for the robotic arm, based on the inertial data from the IMU, to maintain pointing of the optical transceiver module in a direction of interest; (c) send commands to the robotic arm to move to the calculated required position; and (d) repeat the previous steps starting at step (a) to provide an adaptive feedback for maintaining active stabilization of the LiDAR unit.

Example 11 includes the system of Example 10, further comprising a housing having a removable cover, the housing configured to store the LiDAR unit in a stowed position with the cover closed.

Example 12 includes the system of Example 11, wherein the removable cover is configured to open, allowing the robotic arm to extend and position the LiDAR unit in a measurement position.

Example 13 includes the system of any of Examples 10-12, wherein the vehicle is a ground vehicle.

Example 14 includes the system of any of Examples 10-12, wherein the vehicle is an aerial vehicle.

Example 15 includes the system of any of Examples 10-12, wherein the vehicle is a water vehicle.

Example 16 includes a method comprising: (a) providing a LiDAR unit comprising an optical transceiver module, and a robotic arm operatively coupled to the LiDAR unit, the robotic arm mounted on a vehicle; (b) receiving inertial data from an IMU onboard the vehicle, the inertial data comprising orientation and velocity measurements of the vehicle in body axes coordinates; (c) calculating a required position for the robotic arm, based on the inertial data from the IMU, to maintain pointing of the optical transceiver module in a direction of interest; and (d) sending commands to the robotic arm to move to the calculated required position.

Example 17 includes the method of Example 16, further comprising: (d) repeating the method starting at step (b) to provide an adaptive feedback for maintaining active stabilization of the LiDAR unit.

Example 18 includes the method of any of Examples 16-17, wherein the vehicle is a ground vehicle.

Example 19 includes the method of any of Examples 16-17, wherein the vehicle is an aerial vehicle.

Example 20 includes the method of any of Examples 16-17, wherein the vehicle is a water vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
   a light detection and ranging (LiDAR) unit comprising an optical transceiver, the LiDAR unit configured to transmit light into an external interaction air region, and collect scattered portions of the transmitted light from the external interaction air region;
   a robotic arm operatively coupled to the LiDAR unit;
   an umbilical cord coupled to the optical transceiver, wherein the umbilical cord runs along the robotic arm and is configured to provide at least power, cooling, and communication signals to the optical transceiver;
   a processor in operative communication with the robotic arm, the processor configured to control the robotic arm to position and point the optical transceiver in a direction of interest to interrogate the external interaction air region;
   wherein the system is installed on a movable or unstable platform;
   wherein the platform includes an inertial measurement unit (IMU) operatively coupled to the processor; and
   wherein the processor is operative to provide an active stabilization of the LiDAR unit using the IMU.

2. The system of claim 1, wherein the optical transceiver includes a laser transmitter and a set of light collection optics.

3. The system of claim 1, wherein the platform comprises a vehicle.

4. The system of claim 1, wherein the processor is operative to:
   (a) receive IMU measurements comprising orientation and velocity in body axes coordinates;
   (b) calculate a required position for the robotic arm to maintain pointing of the optical transceiver in the direction of interest;
   (c) send commands to the robotic arm to move to the calculated required position; and
   (d) repeat the previous steps starting at step (a) to provide an adaptive feedback for maintaining the active stabilization of the LiDAR unit.

5. The system of claim 1, further comprising a housing having a removable cover, the housing configured to store the LiDAR unit in a stowed position with the cover closed.

6. The system of claim 5, wherein the removable cover is configured to open, allowing the robotic arm to extend and position the LiDAR unit in a measurement position.

7. The system of claim 1, wherein the umbilical cord is further configured to provide optical seeding to the optical transceiver.

8. A system comprising:
a light detection and ranging (LiDAR) unit onboard a vehicle and comprising an optical transceiver, the LiDAR unit configured to transmit light into an external interaction air region, and collect scattered portions of the transmitted light from the external interaction air region;
a robotic arm mounted to the vehicle and operatively coupled to the LiDAR unit, the robotic arm operative to move the LiDAR unit into multiple different positions and orientations, wherein the robotic arm has an upper arm section coupled to the LiDAR unit and a lower arm section coupled to a base, wherein the upper arm section is rotatably coupled to the lower arm section, permitting movement of the LiDAR unit between a stowed position in the vehicle and a measurement position;
an umbilical cord coupled to the optical transceiver, wherein the umbilical cord runs along the robotic arm and provides power, optical seeding, cooling, and communication signals to the optical transceiver;
an inertial measurement unit (IMU) deployed on the vehicle and operative to generate inertial data for the vehicle; and
a processor unit onboard the vehicle, the processor unit in operative communication with the IMU and the robotic arm, wherein the processor unit is operative to provide an active stabilization of the LiDAR unit using the IMU, wherein the processor unit is operative to:
(a) receive and process the inertial data from the IMU, the inertial data comprising orientation and velocity measurements of the vehicle in body axes coordinates;
(b) calculate a required position for the robotic arm, based on the inertial data from the IMU, to maintain pointing of the optical transceiver in a direction of interest;
(c) send commands to the robotic arm to move to the calculated required position; and
(d) repeat the previous steps starting at step (a) to provide an adaptive feedback for maintaining the active stabilization of the LiDAR unit.

9. The system of claim 8, further comprising a housing having a removable cover, the housing configured to store the LiDAR unit in a stowed position with the cover closed.

10. The system of claim 9, wherein the removable cover is configured to open, allowing the robotic arm to extend and position the LiDAR unit in a measurement position.

11. The system of claim 8, wherein the vehicle is a ground vehicle.

12. The system of claim 8, wherein the vehicle is an aerial vehicle.

13. The system of claim 8, wherein the vehicle is a water vehicle.

14. The system of claim 8, wherein:
the robotic arm has multiple degrees of freedom, allowing the LiDAR unit to be automatically manipulated and pointed in any direction.

15. The system of claim 14, wherein:
wherein when the LiDAR unit is in the measurement position, the optical transceiver module transmits light into the external interaction air region, which is adjacent to the vehicle, and collects a scattered portion of the transmitted light from the external interaction air region for use in atmospheric characterization.

16. A method comprising:
(a) providing a light detection and ranging (LiDAR) unit comprising an optical transceiver, a robotic arm operatively coupled to the LiDAR unit and mounted on a vehicle, an inertial measurement unit (IMU) onboard the vehicle, and a processor unit onboard the vehicle, the processor unit in operative communication with the IMU and the robotic arm;
(b) receiving inertial data from the IMU, the inertial data comprising orientation and velocity measurements of the vehicle in body axes coordinates;
(c) calculating a required position for the robotic arm, based on the inertial data from the IMU, to maintain pointing of the optical transceiver in a direction of interest; and
(d) sending commands to the robotic arm to move to the calculated required position;
wherein the processor unit is operative to provide an active stabilization of the LiDAR unit using the IMU;
wherein the robotic arm has multiple degrees of freedom, allowing the LiDAR unit to be automatically manipulated and pointed in any direction;
wherein an umbilical cord is coupled to the optical transceiver and runs along the robotic arm, the umbilical cord providing power, optical seeding, cooling, and communication signals to the optical transceiver;
wherein when the LiDAR unit is in a measurement position, the optical transceiver transmits light into an external interaction air region adjacent to the vehicle, and collects a scattered portion of the transmitted light from the external interaction air region for use in atmospheric characterization.

17. The method of claim 16, further comprising (e) repeating the method starting at step (b) to provide an adaptive feedback for maintaining the active stabilization of the LiDAR unit.

18. The method of claim 16, wherein the vehicle is a ground vehicle.

19. The method of claim 16, wherein the vehicle is an aerial vehicle.

20. The method of claim 16, wherein the vehicle is a water vehicle.

* * * * *